US006564144B1

(12) United States Patent
Cherveny

(10) Patent No.: US 6,564,144 B1
(45) Date of Patent: May 13, 2003

(54) METHOD AND SYSTEM USING A HAND-GESTURE RESPONSIVE DEVICE FOR COLLECTING DATA FOR A GEOGRAPHIC DATABASE

(75) Inventor: Kevin Cherveny, Wilmington, IL (US)

(73) Assignee: Navigation Technologies Corporation, Chicago, IL (US)

( * ) Notice: Subject to any disclaimer, the term of this patent is extended or adjusted under 35 U.S.C. 154(b) by 0 days.

(21) Appl. No.: 10/045,804

(22) Filed: Jan. 10, 2002

(51) Int. Cl.[7] ................................................. G06K 9/00
(52) U.S. Cl. ....................... 701/208; 382/114; 382/177; 382/57; 382/159; 345/702
(58) Field of Search ................................. 701/208, 120, 701/200; 704/275; 345/358, 157, 173, 156, 702; 178/18.01; 348/734, 155; 382/114, 103, 173, 177, 57, 159; 235/472

(56) References Cited

U.S. PATENT DOCUMENTS

| 6,115,482 | A | * | 9/2000 | Sears et al. ................. 382/114 |
| 6,191,773 | B1 | * | 2/2001 | Maruno et al. ............. 345/158 |
| 6,424,334 | B1 | * | 7/2002 | Zimmerman et al. ....... 345/158 |
| 6,501,515 | B1 | * | 12/2002 | Iwamura ..................... 348/734 |
| 2001/0014441 | A1 | * | 8/2001 | Hill et al. .................... 434/236 |
| 2002/0057383 | A1 | * | 5/2002 | Iwamura ..................... 348/734 |
| 2002/0089413 | A1 | * | 7/2002 | Herger et al. .............. 340/5.82 |
| 2002/0126026 | A1 | * | 9/2002 | Lee et al. ..................... 341/22 |
| 2003/0004678 | A1 | * | 1/2003 | Zhang et al. ............... 702/152 |

OTHER PUBLICATIONS

U. S. patent application Ser. No. 09/335,122, filed Jun. 17, 1999, entitled "Method and System using voice commands for collecting data for a Geographic Database", inventors—Kevin Cherveny and Gene Halt.
Web pages, "A Glove that Speaks Volumes" (http:www.wired.com/news/print/0,1294,49716,00.html, authored by Katie Dean (Jan. 28, 2002).
H.–J.Bullinger, J.Ziegler, (EDs.). Human–Computer Interaction:Ergonomics and User Interfaces. Proc. HCI International '99 (the 8th International Conference on HumanComputer Interaction), Munich, Germany, Aug. 22–26, 1999, vol. 1, pp. 531–535.*

* cited by examiner

Primary Examiner—Thomas G. Black
Assistant Examiner—Tuan C To
(74) Attorney, Agent, or Firm—Frank J. Kozak; Jon D. Shutter; Lawrence M. Kaplan

(57) ABSTRACT

A data collection system including a data glove is used by a researcher to safely and efficiently collect and input data for a geographic database. The data collection system is transported by the researcher along roads in a geographic area. As the data collection system is being transported, the positions of the data collection system are determined. The researcher inputs data into the data collection system through the glove by hand and/or finger gestures. The data collection system stores data indicating a determined position with a type of data associated with the gestures. The data obtained by the data collection system is displayed so that the researcher can add or modify data records in the geographic database. The data obtained by the data collection system is used to add data to or modify data in the geographic database.

17 Claims, 16 Drawing Sheets

METHOD AND SYSTEM USING A HAND-GESTURE RESPONSIVE DEVICE FOR COLLECTING DATA FOR A GEOGRAPHIC DATABASE

FIELD OF THE INVENTION

The present invention relates to collecting data for a geographic database and more particularly, relates to using hand and/or finger gestures to collect data for a geographic database.

BACKGROUND

Geographic databases have various uses. Geographic databases are used in in-vehicle navigation systems, personal computers, networked computing environments, and various other kinds of platforms, as well as on the Internet. Geographic databases are used with various kinds of applications to provide various functions including map display, route calculation, route guidance, truck fleet deployment, traffic control, electronic yellow pages, emergency services, and so on.

To provide these kinds of functions, a geographic database includes data that represent geographic features in a covered geographic region. Geographic databases include details about represented geographic features, such as the geographic coordinates of roads in a geographic region, speed limits along the road segments, locations of stop lights, turn restrictions at intersections of roads, address ranges, street names, and so on. Geographic databases may also include information about points of interest in covered regions. Points of interest may include restaurants, hotels, airports, gas stations, stadiums, police stations, and so on.

Collecting information for a geographic database is a significant task. Not only is the initial collection of data a significant undertaking, but a geographic database needs to be updated on a regular basis. For example, new streets are constructed, street names change, traffic lights are installed, and turn restrictions are added to existing roads. Also, new levels of detail may be added about geographic features that are already represented in an existing geographic database. For example, an existing geographic database for roads may be enhanced with information about lane widths, shoulder sizes, lane barriers, address ranges, sidewalks, bicycles paths, etc. Thus, there exists a need to continue to collect information for a geographic database.

According to one method, technicians (referred to herein as "researchers") are assigned the task of collecting data for a geographic database. Each researcher may physically travel throughout an assigned area and record information about observed geographic features. While in the field, the researcher may record the observed information by physically writing on a printed copy of a map. For example, the researcher may write a description about an attribute of a geographic feature adjacent to the representation of the geographic feature on the map. After the data is collected in the field, the researcher uses a computer program to enter data to a main copy of the geographic database. Working from the marked-up printed copy of the map, the researcher makes additions and/or changes to the data in the geographic database to reflect the actual geographic features observed by the researcher while out in the field.

Although this process works well, there is room for improvement. For example, writing descriptions of geographic features onto a printed copy of a map can be time-consuming. Also, it can be difficult to write information legibly while traveling in a moving vehicle.

Computerized data collection techniques for acquiring certain types of geographic data are known. However, known computerized data collection techniques are not suitable for collection of certain kinds of geographic data attributes.

Moreover, laptop computers and other equipment that might lay on or near the researcher's lap during data collection may be inconvenient or uncomfortable with these devices being in close proximity to the researcher while in the vehicle. Also, similar to the difficulty with writing in a moving vehicle, using a mouse, pen, stylus, or touch-screen display to collect data can also be difficult and often frustrating to the researcher.

Accordingly, it is desired to provide an improved method and system for collecting data for a geographic database.

SUMMARY

To address these and other objectives, the present embodiment comprises a data collection system including a hand-gesture responsive device connected to a computing device used by a researcher to collect and input data for a geographic database. The data collection system is transported by the researcher along roads in a geographic area. As the data collection system is being transported, the positions of the data collection system are obtained. Programming in the data collection system recognizes hand and/or finger gestures from the researcher. The data collection system stores data indicating an obtained position with a type of data associated with the gesture. The data obtained by the data collection system is used to add data to or modify data in the geographic database. The data obtained by the data collection system is displayed so that the researcher can add or modify data records in the geographic database.

According to another aspect, a data collection system includes a position determining system that continuously determines the position of the data collecting system as the data collection system is being transported along roads in a geographic area. A gesture recognition unit in the data collection system recognizes a gesture from an attending researcher. Speech synthesis programming in the data collection system converts the recognized gesture from text to speech that is played back for the researcher to hear. Upon receiving a confirmation from the researcher, the data collection system stores the text along with a position obtained by the position determining system. The data obtained by the data collection system may be displayed so that the researcher can add or modify data records in the geographic database.

The present embodiment provides computerized interpretation of hand and/or finger gestures to input data into the data collection system in a safe and substantially accurate manner. Moreover, the present embodiment may be used to input data at a relatively high speed while allowing for an "eyes-free" data entry, which makes it desirable for in-vehicle data collection.

DETAILED DESCRIPTION

I. Overview

Figure 1:
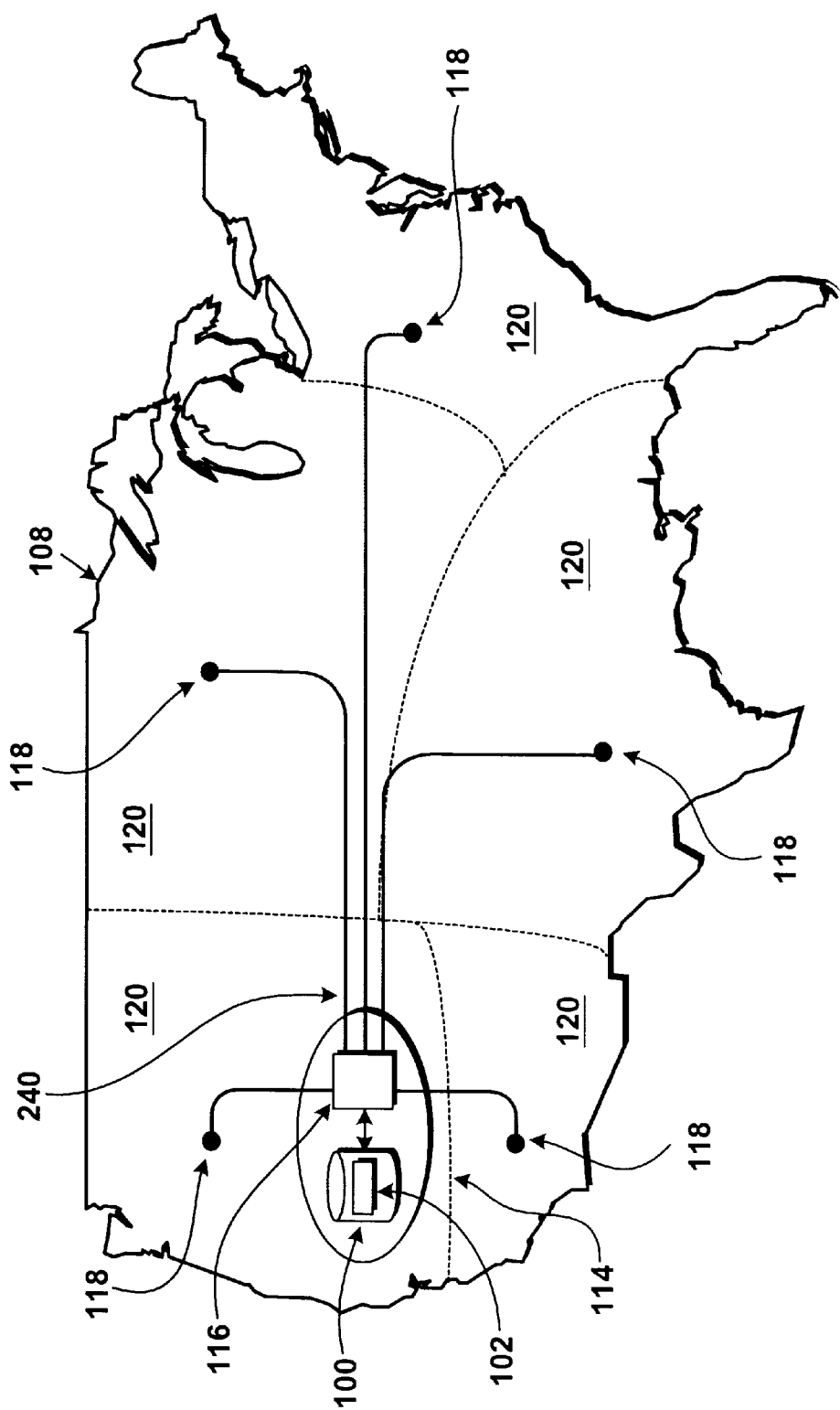
FIG. 1 is a diagram illustrating a coverage area in which an embodiment for collecting data for a geographic database can be used.

FIG. 1 shows a primary version of a geographic database 100. The primary version of the geographic database 100 includes data 102 that represent geographic features in a coverage area 108. The coverage area 108 may correspond to an entire country, such as the United States. Alternatively, the primary version of the geographic database 100 may correspond to several countries, such as the United States, Canada, and Mexico, or France, Germany, and Italy, and so on. According to another alternative, the primary version 100 may represent only a single region within a country, such as the West Coast or the Midwest of the U.S. The primary version of the geographic database 100 is maintained as the copy that has the most up-to-date data relating to the coverage area 108. Various processes may be used to confirm the integrity of the data in the primary version 100. Although the geographic database 100 includes data that represent geographic features in the entire coverage area 108, there may be parts of the coverage area 108 that contain geographic features that are not represented by data in the geographic database, or for which the coverage is sparse.

As stated above, the data 102 in the primary version of the geographic database 100 represents geographic features in the covered area 108. The data 102 includes various attributes of the represented geographic features. For example, the primary version of the geographic database 100 includes data that represent roads and data that represent attributes of roads, such as the geographic coordinates of positions on the roads, street names of the roads, addresses ranges along the roads, turn restrictions at intersections of roads, and so on. The geographic data 102 may also include information about points of interest in the covered geographic area 108. Points of interest may include hotels, restaurants, museums, stadiums, offices, automobile dealerships, auto repair shops, etc. The geographic data 102 may include data about the locations of these points of interests. The geographic data 102 may also include information about places, such as cities, towns, or other communities. The geographic data 102 may include other kinds of information.

The primary version of the geographic database 100 is updated, expanded, and/or otherwise modified on a regular and continuing basis. To facilitate these operations, the primary version of the geographic database 100 is preferably maintained in a format that facilitates updating and development. For example, the data in the primary version 100 may be stored in an uncompressed format. An example of a suitable format is the VSAM format, although other kinds of formats, both proprietary and non-proprietary, may be suitable.

A copy of the primary version 100 of the geographic database is physically located at a first location 114. In one embodiment, the primary version of the geographic database 100 is stored on one or more hard drives and accessed with a mainframe computer 116, such as an Amdahl or IBM mainframe computer. One or more backup copies can also be maintained.

In one embodiment, the geographic data 102 are maintained and developed by Navigation Technologies Corporation of Chicago, Ill. However, it should be understood that the inventive concepts disclosed herein are not restricted to any particular source of data.

Figure 2:
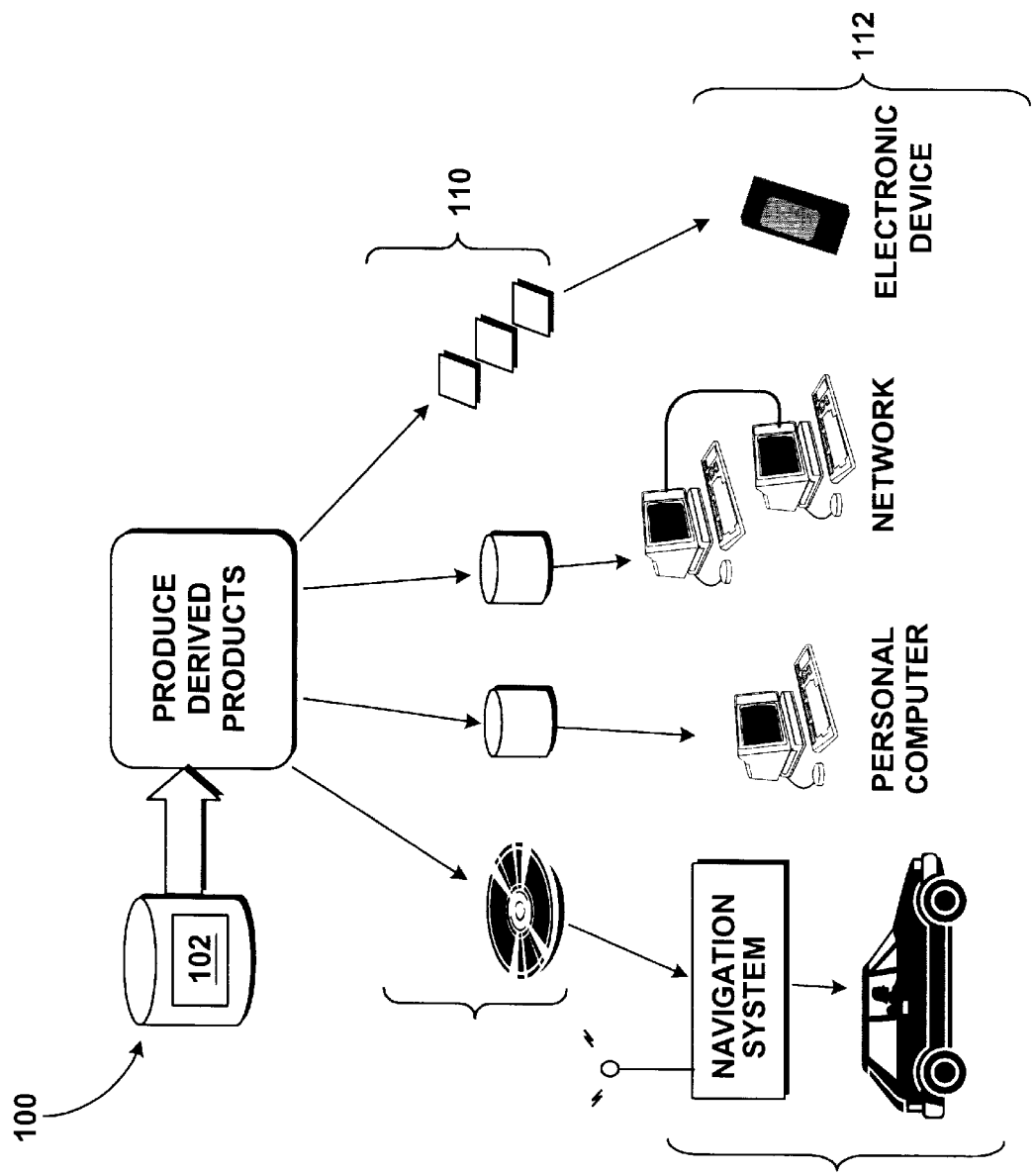
FIG. 2 is a diagram illustrating a process for forming derived database products from the primary version of the geographic database shown in FIG. 1.

As illustrated in FIG. 2, the primary version of the geographic database 100 can be used to make derived database products 110. The derived database products 110 made from the primary version 100 may include only portions of all the data in the primary version 100. For example, the derived database products 110 may include data that relate to only one or more specific regions located within the coverage area 108 of the primary version 100.

The derived database products 110 are used by various applications. For example, the derived database products 110 may be used by applications that provide various functions, such as route calculation, route guidance, vehicle positioning, map display, and electronic yellow pages, as well as other kinds of functions. The derived database products 110 may be used on various kinds of computing platforms 112. For example, the derived database products 110 may be used in navigation systems (such as in-vehicle navigation systems and hand-held portable navigation systems), personal computers (including desktop and notebook computers), and other kinds of devices (such as pagers, telephones, personal digital assistants, and so on). Derived database products 110 may also be used on networked computing platforms and environments, including the Internet.

The derived database products 110 made from the primary version may be in a different format than the format in which the main copy of the database 100 is maintained. The derived database products 110 may be in a format that facilitates the uses of the derived products in the platforms in which they are installed. The derived database products 110 may also be stored in a compressed format on the media on which they are located.

The derived database products 110 may be stored on media that are suitable for the hardware platforms in which they are installed. For example, the derived database products may be stored on CD-ROM disks, hard drives, DVD disks, flash memory, or other types of media that are available now or that become available in the future.

As mentioned previously, the primary version of the geographic database 100 includes the most up-to-date data relating to the coverage area 108. Processes are used to update, check, and expand the coverage of the data 102 in the primary version of the geographic database 100 on a regular basis. Expanding the coverage of the database includes adding data records to represent geographic features that had not already been represented by records in the geographic database. For example, within a coverage area (such as the area 108 in FIG. 1), there may be sub-areas that are not represented. Expanding the coverage of the database also includes adding data for new developments, e.g., new subdivisions. Expanding the coverage may also include adding more detail for areas that are already represented. In addition to expanding the coverage of the geographic database, there is a continuous need to update and check the existing data in the database. For example, speed limits may change, turn restrictions may change, etc.

Referring again to FIG. 1, the processes of updating, checking and expanding are performed by staff at one or more field offices 118. The field offices 118 are located in the geographic area corresponding to the coverage area 108 of the primary version of the geographic database. Each field office 118 may be associated with a separate portion 120 of the entire coverage area 108. Each field office 118 includes the appropriate hardware and software so that data can be exchanged between computing equipment located at the field office and the main computer 116. In one embodiment, the field offices 118 and the main computer 116 are connected with a data network 240. The network 240 may be a wide area network (WAN), the Internet, or any other kind of technology that enables the exchange of data between the main computer 116 and the field offices 118.

Each of the field offices 118 is staffed with one or more technicians (referred to herein as "researchers"). The researchers perform several functions. The researchers collect data for the primary database 100. The researchers may add data about geographic features that had not previously been included in the primary database 100. The researchers may also check data about geographic features that are already represented in the primary database 100 to assure that the data are correct and up-to-date.

Figure 3:
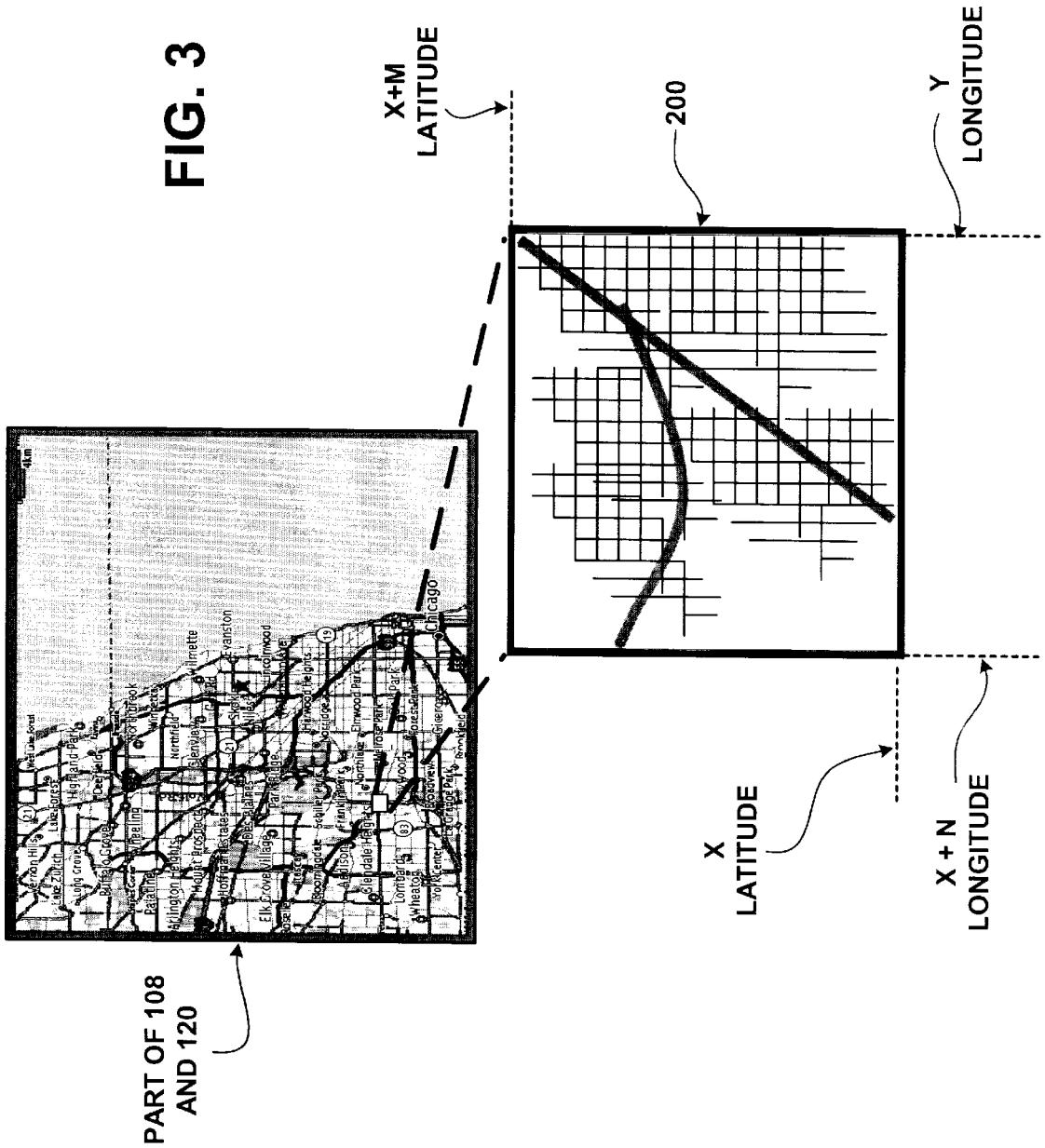
FIG. 3 is map illustrating an assignment area that is located in the coverage area shown in FIG. 1, which contains geographic features about which data will be collected for the primary version of the geographic database.

The data collection activities of a researcher are organized into assignments. Referring to FIG. 3, each assignment is associated with an assignment area 200. The assignment area 200 is a physical geographic area that contains geographic features about which the researcher collects data for updating or expanding the primary version of the geographic database 100. The assignment area 200 is typically a relatively small portion of the coverage area 108. The assignment area 200 may be within the part 120 of the coverage area assigned to the field office.

The size of the assignment area 200 may depend upon various factors, such as the kinds of data being collected, the distance of the assignment area from the field office, the density of geographic features in the assignment area, and so on. For example, the assignment area 200 may be several square miles, or alternatively the assignment area 200 may be hundreds of square miles.

Although data about some types of geographic features can be collected without leaving the location of the field office (using aerial photographs, for example), collection of data for other types of geographic features may require that the researcher physically observe the geographic feature. Thus, a researcher may have to travel to the assignment area to collect some types of data. To perform this function efficiently, a researcher may attempt to collect as much data as possible while out in the field.

One type of geographic data that may require direct physical observation by a researcher to collect is street address data. Other types of geographic features that may require direct observation by a researcher to collect include the speed limit along a road, whether a road is paved, whether a shoulder exists along the road, and whether a lane barrier exists along the road. There are other types of geographic features in addition to these that may require direct physical observation by a researcher to collect, as described below.

II. The Data Collection System

Figure 4:
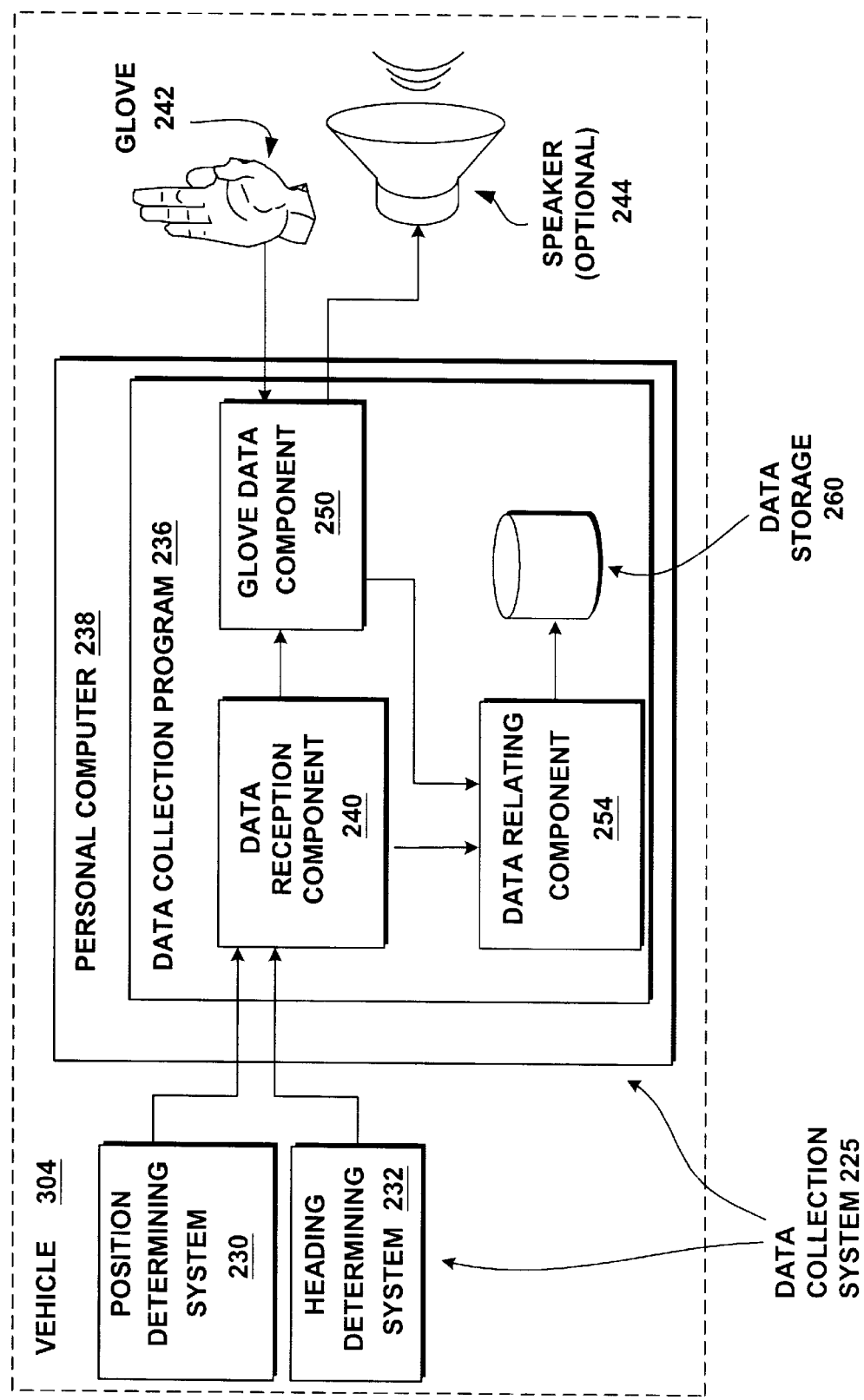
FIG. 4 is a block diagram showing components of an embodiment of a system for collecting data for the geographic database shown in FIG. 1.

FIG. 4 shows components of a data collection system 225. The data collection system 225 is a tool that facilitates collection of those types of data about geographic features that a researcher directly observes to obtain. The data collection system 225 is used to obtain address data, as well as other kinds of data, as described below.

According to this embodiment, the data collection system 225 includes hardware and software components. The data collection system 225 includes a position determining system 230. The position determining system 230 determines its position and hence the position of a vehicle 304 in which it is installed. The position determining system 230 updates this determination on a regular (or irregular) basis. The position determining system 230 provides an output in the form of a series of location data indicating the instantaneous vehicle position determined over time. For example, the position determining system 230 may determine the position of the vehicle every second. Alternatively, the position determining system 230 may determine the position of the vehicle less frequently, e.g., every 2 seconds, every 5 seconds, etc., or more frequently, such as every 0.5 seconds or every 0.1 seconds, or even more frequently. Each location data may be defined by geographic coordinates, i.e., latitude and longitude, and optionally altitude. The position determining system 230 may be implemented using known technology, such as GPS, DGPS, dead-reckoning, and so on. The position determining system 230 may be implemented using a suitable GPS receiver. Suitable systems are commercially available from Garmin, Trimble, Satloc, and Ashtech.

The data collection system 225 also includes a heading determining system 232. The heading determining system 232 determines the heading of the vehicle. The heading determining system 232 provides an output in the form of a series of vehicle heading data determined over time. Each heading data may be defined by an azimuth reading. The heading determining system 232 updates this determination on a regular (or irregular) basis. For example, the heading determining system 232 may determine the heading of the vehicle every second, every 2 seconds, every 5 seconds, etc., or more frequently, such as every 0.5 seconds or every 0.1 seconds, or even more frequently. The outputs of the heading determining system 232 do not necessarily coincide with the outputs of the position determining system 230. The heading determining system 232 may be implemented using known technology, such a compass, a gyroscope, etc.

The position determining system 230 and the heading determining system 232 may be part of the data collection system 225. Alternatively, the position determining system 230 and the heading determining system 232 may be standalone units that provide their outputs to the data collection system 225. According to another alternative, the position determining system 230 and the heading determining system 232 may be part of an in-vehicle navigation system installed in the vehicle in which the researcher is traveling. In this latter alternative, the data collection system 225 is coupled to receive the outputs of the position determining system and the heading determining system from the in-vehicle navigation system.

The data collection system 225 includes a data collection program 236. The data collection program 236 may be a software program installed on a portable computing device 238, such as a notebook computer. In one embodiment, the data collection program 236 is written in the C programming language. In alternative embodiments other programming languages may be used, such as C++, Java, Visual Basic, and so on.

The data collection program 236 includes a data reception component 240. The data reception component 240 is a programming routine that receives the series of outputs from the position determining system 230 and the heading determining system 232.

The data collection system 225 also includes a hand gesture responsive device (also referred to herein as a "glove") 242 and optionally, a speaker 244 to provide feedback. The glove 242 may be a peripheral device coupled to the portable computing device through known interfaces, and speaker 244 may be part of the hardware of the portable computing device 238. The data collection program 236 includes a glove data component 250, or alternately, the glove data component 250 is external to the portable computing device 238. The glove data component 250 is a programming routine that receives the output from the glove 242. The glove data component 250 may also provide an output to the speaker 244 for feedback to the user.

The data collection program 236 also includes a data-relating component 254. The data-relating component 254 interfaces with the data reception component 240 and the glove data component 250. The data-relating component 254 also interfaces with a data storage device 260. The data storage device 260 may be part of the hardware of the portable computing device 238, such as the hard drive of the portable computing device 238, or the data storage device 260 may be a peripheral device coupled to the portable computing device through a known interface. The functions of the data reception component 240, the glove data component 250, and the data-relating component 254 are described below. But first, the glove 242 is described.

III. Operation of the Glove

The hand gesture responsive device or glove 242 is an input device that measures the movements of the researcher's hand/and fingers and transmits them to the portable-computing device 238. The glove 242 is generally lightweight, with sensors that accurately and repeatedly measure the position and movements of the fingers and hand. Some sophisticated data gloves may instead be used to measure movement of the wrist and elbow in addition to movements of the fingers and hand. The data glove 242 can contain control buttons that might be used for frequently used commands such as "COMMIT," and so on, such commands are described below. Note also that the hand gesture responsive device does not have to include a glove, but may instead be a device which captures hand and/or finger movements by tracking gestures via laser, optics, still frame pictures, and so on.

The glove 242 offers multiple degrees of freedom for each finger and hand to indicate the researcher's intentions. Generally, the number of degrees of freedom depends on the number of sensors in the glove. Presently, some common gloves have 12 to 24 sensors. The sensors are bend sensitive and their resistance varies linearly (or non-linearly) with the bend. The sensors are thin and flexible and can provide an undetectable resistance to bending. Since the sensors exhibit low sensitivity to their positions over finger joint and to the joint radii of curvature, gloves may provide high quality measurements over a wide range. If necessary and depending on the type of glove used, the movement of the vehicle may be taken into account by subtracting out the motion of the vehicle from the output signal of the glove 242.

In one embodiment, the glove 242 is connected to the portable-computing device 238 by a serial cable, but in another embodiment, the glove 242 is connected to the portable-computing device 238 by radio frequencies. Suitable glove systems are commercially available from Essential Reality, LLC and Immersion Corporation.

As previously described, the glove 242 can be used to sign various language messages for data collection. A typical example of sign language is American Sign Language (ASL). Many words or ideas have ASL signs, but when a word does not have a sign it may be spelt out using a manual alphabet or may be represented by a specific gesture programmed in a table.

IV. Operation of the Data Collection System

Figure 5:
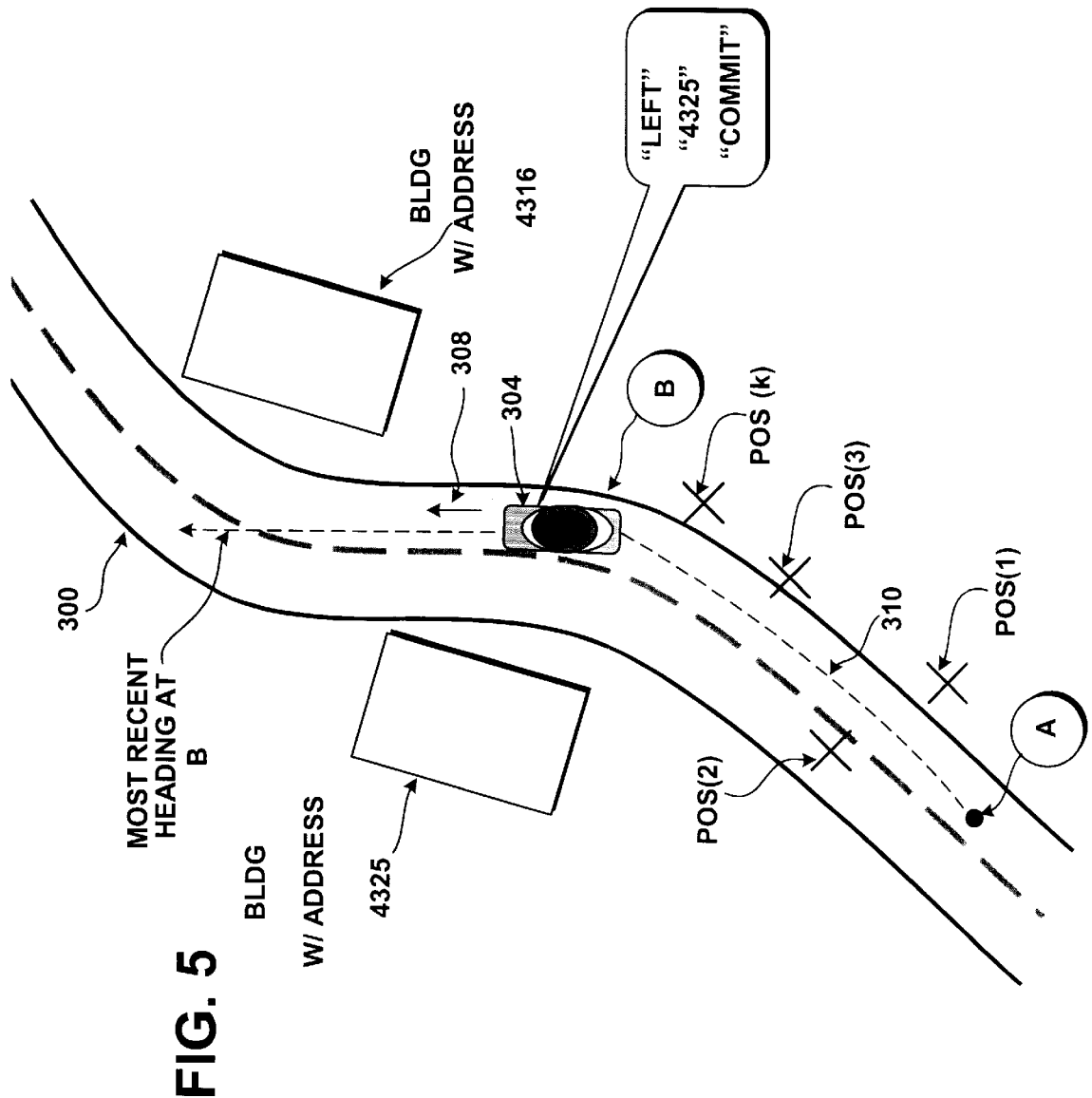
FIG. 5 shows a portion of a road in the assignment area of FIG. 3 and illustrates a use of the system shown in FIG. 4.

Operation of the data collection system 225 is described with reference to FIGS. 4 through 16. According to a first embodiment, a researcher travels in a vehicle along roads in the assignment area. The researcher may travel along the roads in the assignment area by car, but any other suitable mode of transportation may be used. Referring to FIG. 5, there is an illustration of a road 300. The researcher is a passenger in a vehicle 304. The vehicle 304 is equipped with the data collection system 225. The vehicle 304 is traveling along the road 300 in the direction indicated by the arrow 308. The vehicle 304 is at a location, labeled "B", having traveled along the path 310 of the road 300 from the location labeled "A."

The positioning determining system 230 in the vehicle 304 determines instantaneous positions of the vehicle 304 as the vehicle 304 travels along the road 300. FIG. 5 illustrates a series of positions POS(1), POS(2), POS(3) and POS(k) determined by the position determining system 230. The series of positions are positions at which the position determining system 230 determined the vehicle 304 to be as the vehicle 304 traveled along the road 300 from the location indicated by "A" to the location indicated by "B." It is noted that the series of positions determined by the position determining system 230 may not necessarily lie exactly along the path 310 of the vehicle 304 as it traveled along the road 300. These discrepancies may result from normally occurring variances in the readings of the position determining system 230.

Likewise, as the vehicle 304 travels along the road 300, the heading determining system 232 determines a series of headings. The series of headings are not illustrated in FIG. 5, but the most recent heading at location "B" is shown.

As the vehicle 304 travels along the road 300, the data reception component 240 in the data collection program 236 receives the data indicating the series of positions, POS(1), POS(2), POS(3), and POS(k) from the position determining system 230 and the data indicating the series of vehicle headings from the heading determining system 232. The data reception component 240 forwards these data to the data-relating component 254 which stores the data in a file (e.g., the file 314 in FIG. 7) on the data storage 260.

As the vehicle 304 travels, the data reception component 240 continues to receive data indicating the vehicle position and heading and the data-relating component 254 continues to store these data. As these processes continue, the glove data component 250 of the data collection program 236 is in a mode in which it is ready to receive a command given by hand and/or finger movements and/or body gestures (collectively referred to hereafter as "gestures"). The glove 242 may give the hand and/or finger movements. Body gestures may be given by, for example, the researcher's arm or head movement, if sensors, in addition to the glove 242, are placed on the researcher at the appropriate locations such as the arm or neck region of the researcher.

According to this example, when the vehicle 304 is at the location labeled "B", the researcher uses the data collection system 225 to collect address data. When the vehicle 304 is at the location labeled "B", the researcher observes an address "4325" on a building along the left side of the road 300. The researcher makes a specific gesture using the glove 242 to indicate the command "LEFT." In one embodiment, the researcher uses a particular hand gesture assigned to the command "LEFT," but in another embodiment, the researcher spells the command or a portion thereof using ASL depending on how the glove data component 250 is programmed.

Figure 6:
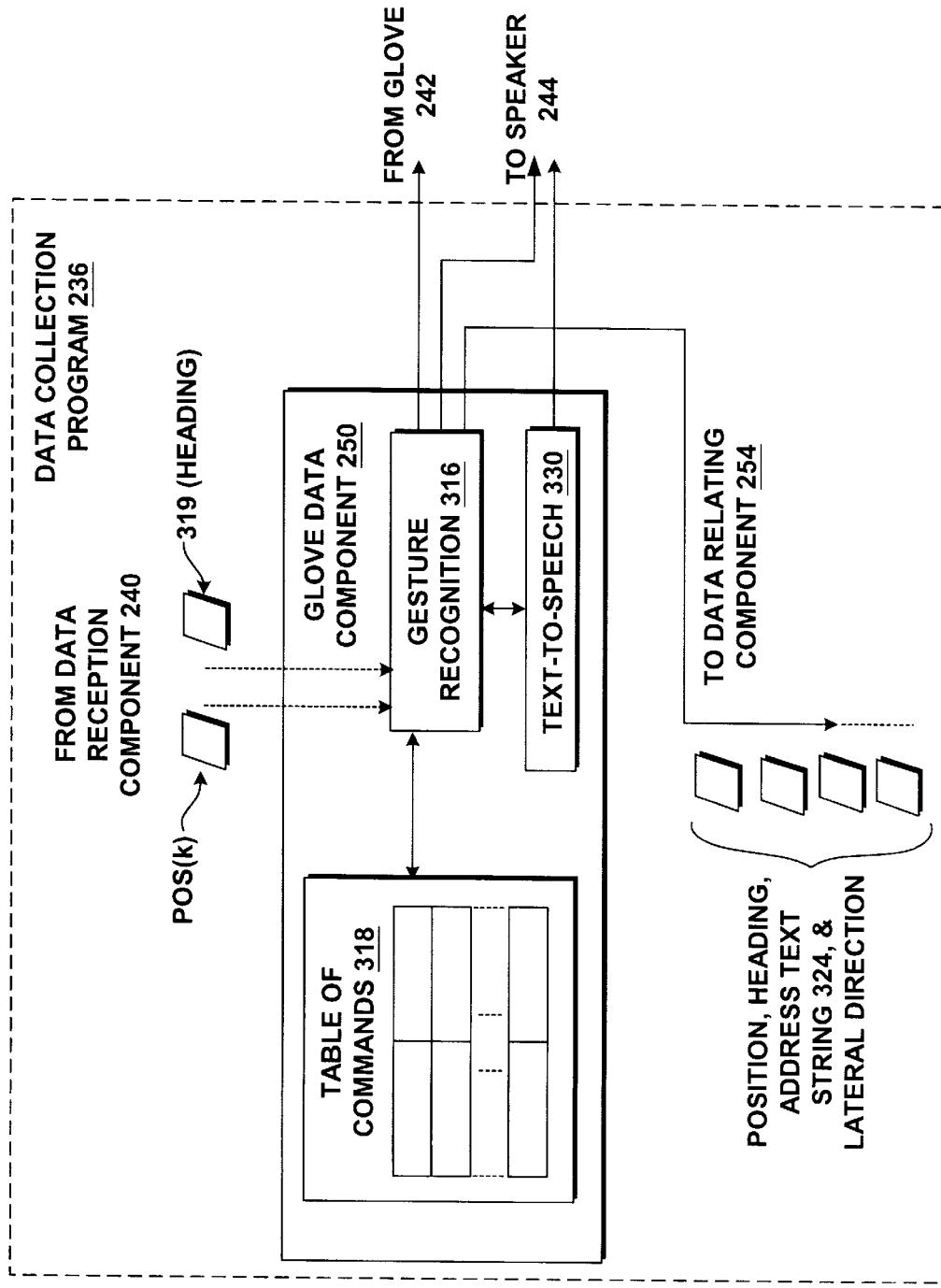
FIG. 6 is a block diagram showing components of the glove data portion of the data collecting system shown in FIG. 4.

Referring to FIG. 6, a gesture recognition routine 316 in the glove data component 250 of the data collection program 236 attempts to recognize the gesture "LEFT." The gesture recognition routine 316 checks a table 318 of stored gesture commands for a match.

Figure 7:
FIG. 7 is a table of commands in which the gesture recognition compares gestures to stored gestures.

FIG. 7 shows an exemplary table 318 of stored gestures that includes commands for "LEFT", "RIGHT", "CORNER", "PLACE", "SPEED", "DIVIDER", "COMMIT", and so on. The table 318 may include other commands in addition to or instead of these. Moreover, the stored gestures may include letters of the ASL alphabet or numeral system. Note that the gestures may overlap with each other closely, but the amount of overlap depends on the number of sensors and/or sensitivity of the sensors in the glove 242 to distinguish between the different gestures. It should be understood that the gestures in table 318 shown are by way of example only, and that other gestures may be programmed to represent the commands. Thus, one skilled in the art would appreciate that the gestures may be individually programmed to represent any number of desired commands.

Referring back to FIG. 6, if the gesture is recognized, the gesture recognition routine 316 performs two steps. First, the gesture recognition routine 316 identifies the most recent position data, POS(k), received by the data reception component 240 from the position determining system 230 and the most recent heading data 319 received by the data reception component 240 from the heading determining system 232. Second, the gesture recognition routine 316 outputs an audible output (e.g., a tone) to the speaker 244 indicating that the gesture has been recognized. Alternately, once a match is found for the gesture, the gesture's corresponding character text string 324 is sent to a text-to-speech synthesis routine 330 in the glove data component 250. The text-to-speech synthesis routing 330 converts the character text string 324 into an audio output.

According to this example, upon hearing the audible output indicating that the gesture has been recognized, the researcher may make a specific gesture using the glove 242 to indicate the command "ADDRESS." As before, the gesture recognition routine 316 checks the table 318 of stored gesture commands for a match. Assuming a match, the researcher may make specific gestures to indicate the observed address "4325" using the glove 242. The output of the glove 242 is received by the gesture recognition 316 and checks the gestures "4," "3," "2," and "5" to the table 318 of stored gesture commands. As above, once a match is found for each gesture, the gesture's corresponding character text string 324 is sent to a text-to-speech synthesis routine 330 in the glove data component 250. The text-to-speech synthesis routing 330 converts the character text string 324 into an audio output. The audio output is played over the speaker 244 so that the researcher can hear it thereby allowing the researcher to confirm that the gesture recognition 316 properly converted the gestured phrase "4325" into a character text string. Using the text-to-speech synthesis routine 330 to play back the phrase that had been converted using the gesture command recognition 316 enables the researcher to know immediately whether the gesture command recognition 316 has accurately captured the gestured phrase "4325."

If the audio output of the converted text string played back over the speaker 244 corresponds to the phrase gestured by the researcher, the researcher indicates that the address data can be stored. The researcher makes this indication by gesturing the command "COMMIT." The gesture recognition routine 316 attempts to recognize the gesture command "COMMIT" using the table 318 of stored gesture commands. If the gesture recognition routine 316 recognizes the gesture command "COMMIT", the following two steps are performed. First, the glove data component 250 outputs a command to provide an audible output (e.g., a tone) to the speaker 244 indicating that the command "COMMIT" has been recognized. Second, the glove data component 250 sends the most recent position data, POS(k), the most recent heading data 319, the lateral direction (i.e., "left" or "right") as indicated by the researcher to the data-relating component 254, and the address text string 324 to the data-relating component 254.

Figure 8:
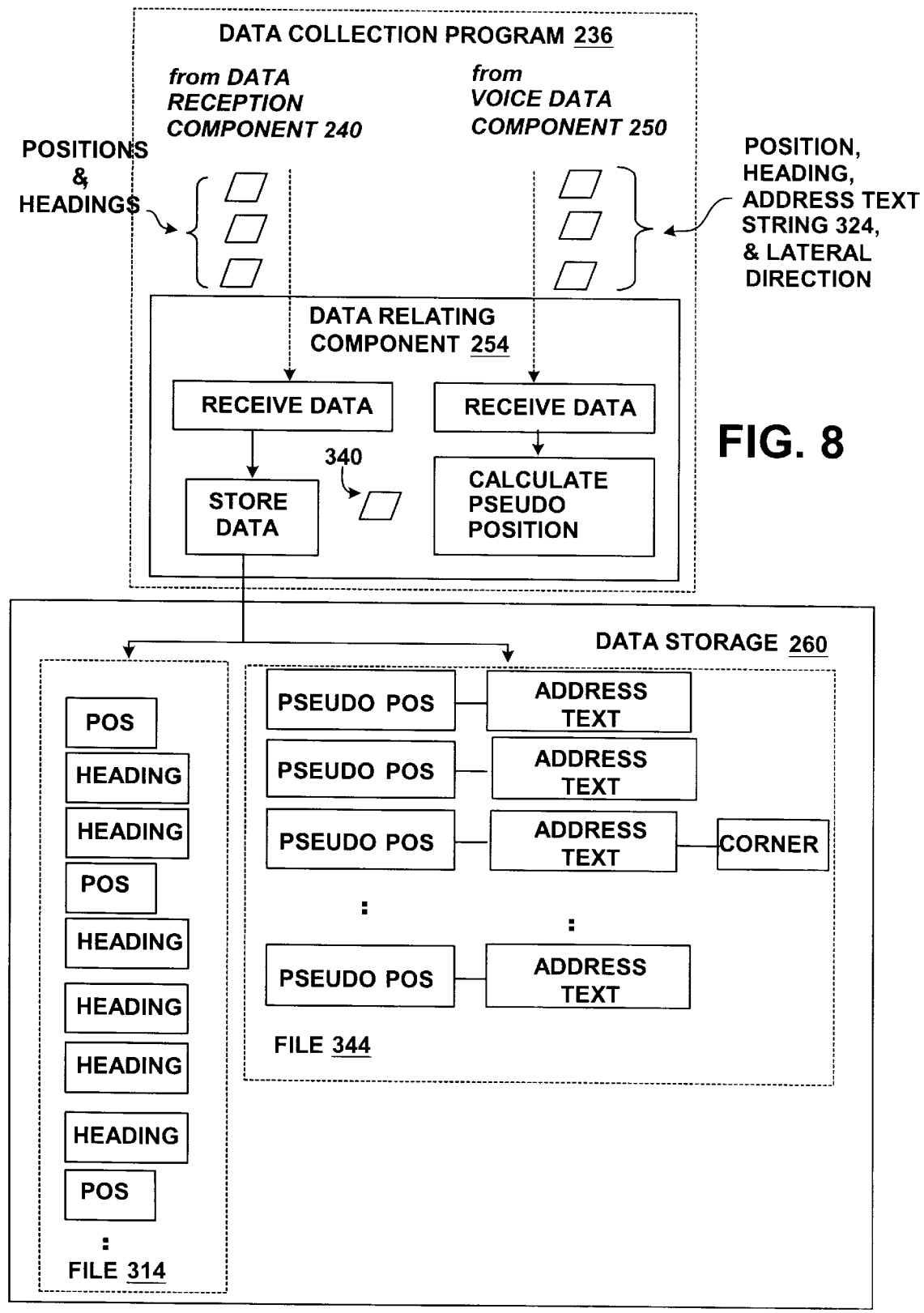
FIG. 8 is a block diagram showing components of the data-relating portion of the data collecting system shown in FIG. 4.

Referring to FIG. 8, the data-relating component 254 receives the data indicating the most recent position data POS(k), the data indicating the most recent heading, and the lateral direction data. Using this information, the data-relating component 254 calculates a first pseudo position 340. The first pseudo position 340 is defined by geographic coordinates, i.e., latitude, longitude, and optionally altitude. The first pseudo position 340 is calculated to be at a location approximately 5–10 meters away from the most recent position (indicated by the data POS(k)) in the lateral direction (i.e., "left") with respect to the direction of the most recent heading 319. In this embodiment, the pseudo position is determined by calculating a position 90° from the direction of the heading in the lateral direction indicated. The pseudo position is not necessarily intended to correspond to the exact position of the building with the associated address. The data-relating component 254 associates the address text string 324 with data indicating the pseudo position 340. The data-relating component 254 stores these data items together in a file 344 on the data storage 260.

Referring again to FIG. 6, it may occur that after playing back the phrase, the researcher determines that the originally gestured phrase had not been correctly recognized. In this embodiment, the researcher may make this determination by hearing the audio output of the text-to-speech synthesis routine 330, but in another embodiment, the researcher might read the output on a monitor or screen. If the researcher determines that the converted phrase should not be saved, he/she may indicate this intention to the data collection system 225 by another gesture command, such as "ABORT." Then, if the researcher gestures the command "ABORT", the gesture command recognition routine 316 attempts to recognize the gesture command "ABORT" using the table 318 of stored gesture commands. Note that after an address has been converted to text, the gesture recognition routine 316 may be programmed to limit the gesture command choices to only "COMMIT" and "ABORT." If the gesture recognition routine 316 recognizes the gesture command "ABORT", the converted character text string data 324 is discarded. The glove data component 250 of the data collection program 236 may then return to the mode in which it waits to receive another gesture.

It may also occur that when the researcher gestures a command such as "COMMIT" or "ABORT", the gesture recognition routine 316 cannot recognize the command. If this occurs, the gesture recognition routine 316 provides an output to the speaker indicating that the command has not been recognized. The output may be in the form of an error tone or beep. The gesture recognition routine 316 may provide the researcher with an opportunity to gesture the command again.

The glove data component 250 may also provide a feature that allows the researcher to enter commands or addresses manually, for example via the keyboard of the notebook computer 238. Entering commands or addresses manually may be provided as an option. Moreover, the glove 242 may be used to act as a peripheral input such as a mouse or stylus when entering commands or addresses manually. For example, the glove 242 may be used to navigate on-screen menus, and so on.

Figure 9:
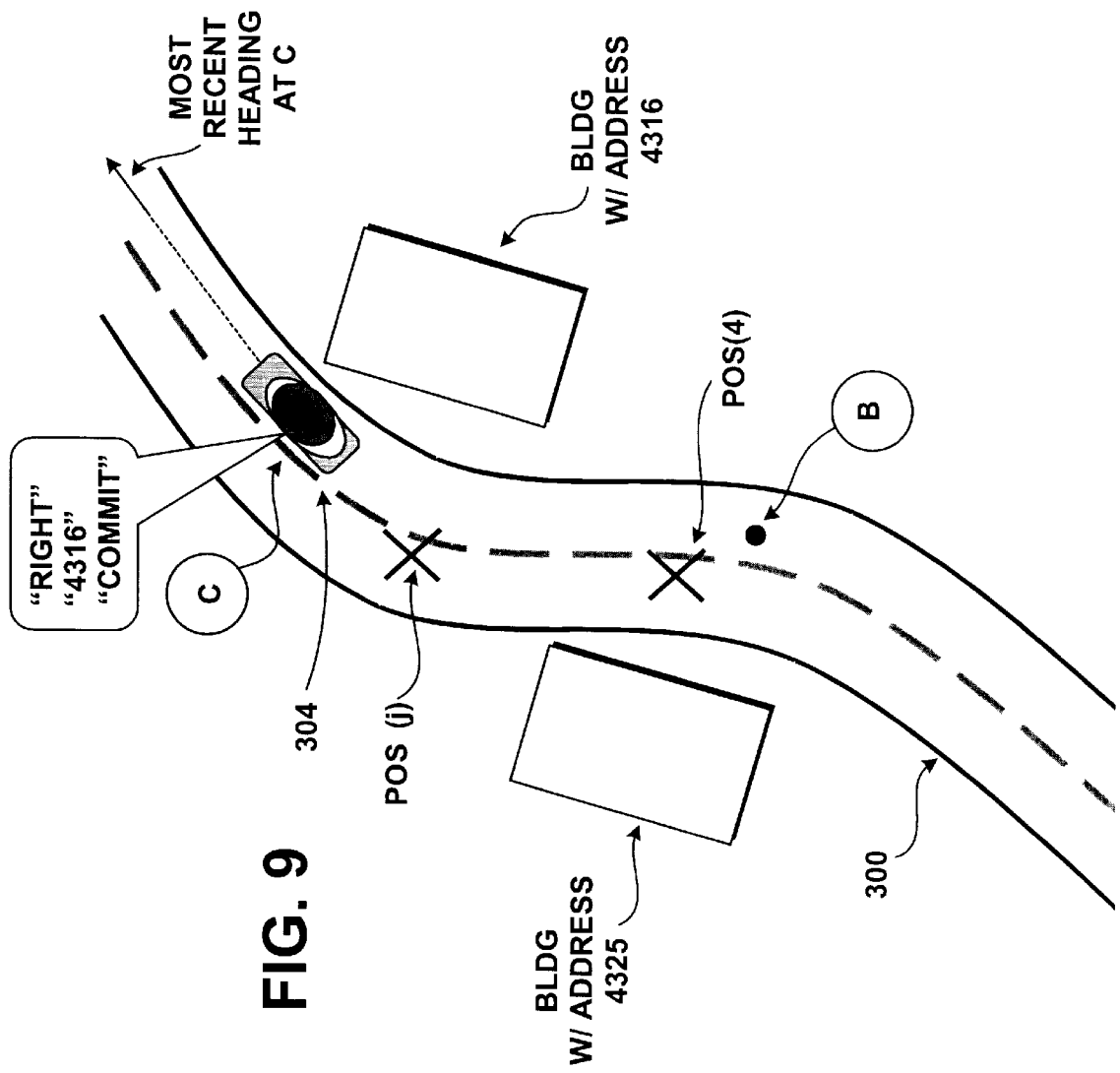
FIG. 9 shows the portion of a road shown in FIG. 5 and illustrates another use of the data collection system.

After the researcher has used the data collection system 225 to store the address data associated with the first pseudo position 280, the researcher may use the data collection system 225 to store more address data. Referring to FIG. 9, the vehicle 304 is shown to have traveled along the road 300 from the position, labeled "B" to a position, labeled "C." As the vehicle 304 travels from the position labeled "B" to the position labeled "C", the position determining system 230 continues to acquire data indicating the geographic coordinates of the vehicle 304. The positions corresponding to these data are labeled POS(4) and POS(j). Similarly, as the vehicle 304 travels from the position labeled "B" to the position labeled "C", the heading determining system 232 continues to acquire data indicating the vehicle heading. These data indicating the vehicle position and heading are forwarded to the data-relating component 254 which stores the data in the file 314 (in FIG. 8) on the data storage 260, as described above.

As the vehicle 304 passes the building with the address "4316", the researcher observes the address and uses the data collection system 225 to store more address data. The researcher gestures the command "RIGHT." As before, the gesture recognition routine 316 in the glove data component 250 of the data collection program 236 attempts to recognize the command using the stored list 318 of commands. If the command "RIGHT" is recognized, the researcher is prompted to further gesture another command. In this example, the researcher may wish to enter the command "ADDRESS." Assuming a match, the researcher responds by gesturing "4," "3," "1," and "6." The text-to-speech synthesis routine 330 plays back the text for the researcher to hear after each number or after the address is entered in its entirety, whichever is more desirable. As before, if the gestured phrase has been successfully converted to text, the researcher gestures the command "COMMIT." The text of the address "4316" along with the data indicating the most recent vehicle position, POS(j), the most recent vehicle heading, and the lateral direction (i.e., "right") are passed to the data-relating component 254. The data-relating component 254 calculates a second pseudo position. This second pseudo position is spaced laterally approximately 5–10 meters to the right of the most recent vehicle position. The coordinates of the second pseudo position and the text of the address are stored together in the file 344 in the data storage 260. The researcher can continue to add address information in this manner as the vehicle travels along roads in the assignment area.

Figure 10:
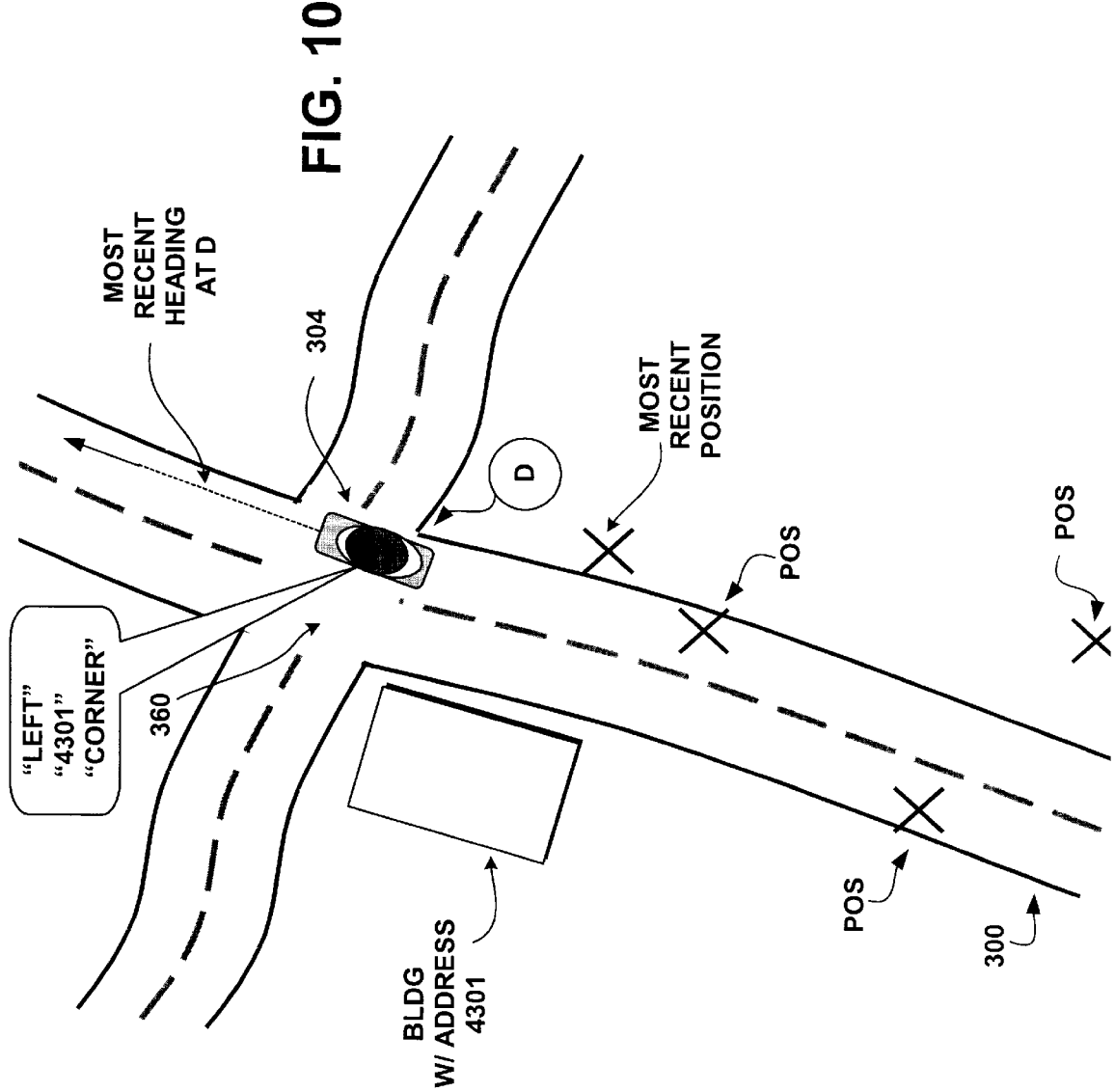
FIG. 10 shows the portion of the assignment area shown in FIG. 5 during a further stage of operation of the data collection system.

Another aspect of the data collection system 225 is described in connection with FIG. 10. FIG. 10 shows the vehicle 304 at a location, labeled "D", which is further along the road 300. At the location labeled "D", the vehicle is passing through an intersection 360. As the vehicle 304 continues to travel along the road 300, the position determining system 230 (shown in FIG. 4) continues to acquire data indicating the geographic coordinates of the vehicle and the heading determining system 232 continues to acquire data indicating the vehicle heading. The position data and the heading data continue to be passed to the data-relating component 254 which stores the data in the file 314 (in FIG. 8) on the data storage 260, as described above.

As the researcher passes through the intersection 360, he/she observes an address "4301" of a building on the corner. The researcher gestures the command "LEFT," and then the command "CORNER." The gesture recognition routine 316 (in FIG. 6) attempts to recognize the command "LEFT" then the command "CORNER" using the list 318 of stored commands. If the command "LEFT" and "CORNER" are recognized, the researcher is prompted to gesture an address. The researcher responds by gesturing "4," "3," "0," and "1." The text-to-speech synthesis routine 330 plays back the text for the researcher to hear. When the gesture recognition routine 316 recognizes the command "LEFT" and "CORNER", the text of the address "4301" along with the data indicating the most recent vehicle position, the most recent vehicle heading, the lateral direction (i.e., "left"), and the data "LEFT CORNER" are passed to the data-relating component 254. The data-relating component 254 calculates a pseudo position. This pseudo position is spaced laterally approximately 5–10 meters to the left of the most recent vehicle position. The coordinates of the pseudo position and the text of the address are saved together in the file 344 along with an indication that the address is associated with a "LEFT CORNER."

The researcher continues to travel on roads in the assignment area using the data collection system 225 in the vehicle 304 to collect address data. After the researcher has finished collecting address data in the assignment area, the data that has been collected using the data collection system 225 can be used to add address information to the primary version 100 of the geographic database.

V. Other Types of Data Collected

The data collection system (225 in FIG. 4) can be used to collect data other than addresses. For example, the data collection system 225 can be used to collect speed limit information, information about whether a lane divider exists along a road, and information about whether the road is unpaved. As mentioned above in connection with FIG. 6, the gesture recognition routine 316 in the glove data component 250 of the data collection program 236 uses a table 318 of stored gesture commands. In addition to the commands "LEFT", "RIGHT", "CORNER", and "COMMIT", the table 318 includes commands for "PLACE", "SPEED", and "DIVIDER." These commands may be used by a researcher traveling along roads in an assignment area to collect data for making additions and modifications to a geographic database. Other commands may include:

| | |
|---|---|
| Divider | Carpools Allowed |
| Drive Path Lane Traversal | Thru Traffic Allowed |
| Center Turn Lane Present | Trucks Allowed |
| Lane Transition | Automobiles Allowed |
| Number of Lanes | Pedestrians Allowed |
| Relative Altitude | Buses Allowed |
| Travel Restriction | Bicycles Allowed |
| Traffic Signal Present | Bridge |
| Toll Booth | Tunnel |
| One Way Restriction | Paved |
| Speed Limit | Private |
| School Zone | Gated |
| Speed Advisory | Ramp |
| Variable Speed | Frontage |
| Speed Bump | Tollway |
| Deliveries Allowed | Built Up Area |
| Taxis Allowed | Addresses |
| Emergency Vehicles Allowed | Street Name |

A. Collecting Speed Limit Data Example

The commands "PLACE" and "SPEED" can be used with the data collection system 225 to collect speed limit information in order to add the information to a geographic database. The "PLACE" command works similarly to the "LEFT" and "RIGHT" commands. After recognizing the "PLACE" command, the glove data component 250 converts words (i.e., numbers) gestured by the researcher into a text string and then uses the text-to-speech synthesis routine 330 to play back the converted text. The "PLACE" command also causes the data-relating component 254 to determine a pseudo position along the path of the vehicle based on the most recent vehicle position obtained by the position determining system 230. In one embodiment, the pseudo position corresponds to the most recent position determined by the position determining system 230. Alternatively, the pseudo position may be spaced or extrapolated a short distance (e.g., 5–10 meters) in advance of the most recent position, based upon the most recent vehicle heading. The "SPEED" command works similarly to the "CORNER" command or the "COMMIT" command. The "SPEED" command associates the text string with an indication that the text string represents a speed limit. The text string, the pseudo position, and the data indicating that the text string represents a speed limit are stored in a data file on the computing device on which the data collection program 236 is being run. The data file may be the same data file (344 in FIG. 8) used to store the address data.

B. Collecting Divided Highway Data Example

Another type of data that can be collected using the data collection system 225 is lane divider information. Lane divider information can be collected using the gestured commands "DIVIDER LINK", "DIVIDER OPEN" and "DIVIDER CLOSED." These commands cause the data-relating component 254 to determine a pseudo position along the path of the vehicle. In a preferred embodiment, the pseudo position is the most recent vehicle position obtained by the position determining system 230. Alternatively, the pseudo position can be a different position. The "DIVIDER LINK" command associates the pseudo position with an indication that a lane divider exists along the road segment at the pseudo position. The "DIVIDER OPEN" command associates the pseudo position with an indication that a lane divider exists along the road segment at the pseudo position up to the intersection being approached, but that the lane divider does not extend across the intersection. The "DIVIDER CLOSED" command associates the pseudo position with an indication that a lane divider exists along the road segment at the pseudo position up to and across the intersection being approached. The pseudo position, data indicating that a lane divider exists along the pseudo position, and the kind of lane divider (i.e., "link", "closed", or "open") are stored in a data file which may be the same data file (344 in FIG. 8) used to store the address data and the speed limit data.

C. Collecting Unpaved Highway Data Example

Another type of data that can be collected using the data collection system 225 is unpaved highway information. Unpaved highway information can be collected using the gesture command "UNPAVED." The "UNPAVED" command works like the "DIVIDER" commands. The "UNPAVED" command causes the data-relating component 254 to determine a pseudo position along the path of the vehicle from the most recent vehicle position obtained by the position determining system 230. The "UNPAVED" command associates the pseudo position with an indication that the road segment is unpaved at the pseudo position. The pseudo position and the data indicating that the road segment is unpaved are stored in a data file which may be the same data file (344 in FIG. 8) used to store the address data, the speed limit data, and the lane divider data.

VI. Adding Data to the Database

Figure 11:
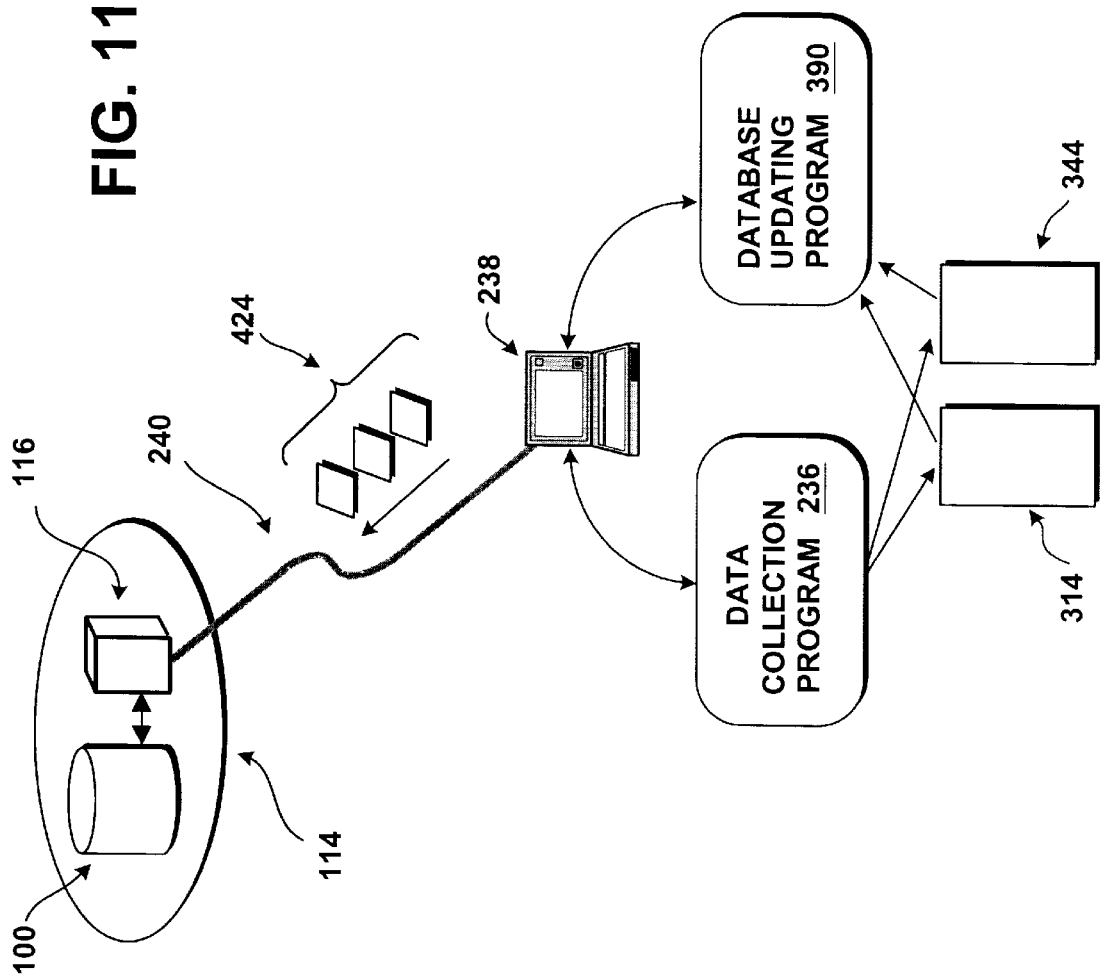
FIG. 11 illustrates an arrangement for updating the primary geographic database using the data collected with the data collection system of FIG. 4.

After the researcher has finished collecting address data in the assignment area, the researcher returns to the field office or alternatively, to another location from which the data collected using the data collection system 225 can be used to add data to the geographic database. In order to apply address data to the primary version of the geographic database 100, the researcher uses a database-updating program. FIG. 11 shows an embodiment of a database updating program 390 installed on the portable computer 238. The database-updating program 390 may be part of the data collection program 225 or may be a standalone program. Alternatively, the database updating component 390 may be installed on the main computer 116 (in FIG. 1) and run remotely from the portable computer 238. The portable computer 238 (or the other computer platform) upon which the database updating program 390 is installed includes the appropriate hardware and software so that data from the primary version of the database 100 can be loaded into it. According to one embodiment, the portable computer 238 connects to the network 240 at the field office to receive data from the main computer 116. Alternatively, the portable computer 238 can access the main computer 116 through any other kind of connection, such as a dial-up connection or a wireless connection.

The researcher provides the files 314 and 344 that were formed by the data collection program 236 to the database-updating program 390. If the database updating program 390 and the data collection program 236 are installed on the same computer, the files 314 and 344 may be accessed directly. Alternatively, if the database updating program 390 and the data collection program 236 are installed on different computers, the files 314 and 344 may be copied or otherwise transmitted so that they are accessible to the database updating program 390. The database updating program 390 may be similar or identical to the program described in the copending patent application entitled "Method and System for Collecting Data for Updating A Geographic Database," Ser. No. 09/256,389, filed Feb. 24, 1999, the entire disclosure of which is incorporated by reference herein.

The database updating program 390 provides for adding new data records to the primary version of the geographic database 100 or alternatively, the database updating program 390 provides for modifying data records that are already in the primary version of the geographic database 100. When performing either of these functions, the database updating program 390 may request the main computer 116 to provide copies of some of the data records in the primary version of the geographic database 100 for use by the geographic database updating program 390. For example, if address range data is being added to road segment data records that are already in the primary version of the geographic database, copies of these road segment data records are provided to the database updating program 390 so that the address range data can be added by the researcher. While the researcher is working on these road segment data records, the main computer 116 may lock the copies of these road segment data records in the primary version of the geographic database 100 so that no other researcher can access these same data records. This assures that no two researchers are modifying the same data record at the same time, which may lead to conflicting modifications.

When adding new data records to the geographic database to represent road segments that had not previously been represented, it may still be necessary to request data records from the primary version of the geographic database. New data records that represent road segments that had not previously been represented in the geographic database may connect to road segments that are represented by data records in the geographic database. To correctly describe the connections of these new road segments to road segments that are already represented, it may be necessary to modify at least some of the existing data records that represent road segments. While these existing data records are being modified by the researcher using the database updating program 390, the corresponding original copies of these records in the primary version of the geographic database are locked so that no other researcher can modify these records.

Figure 12:
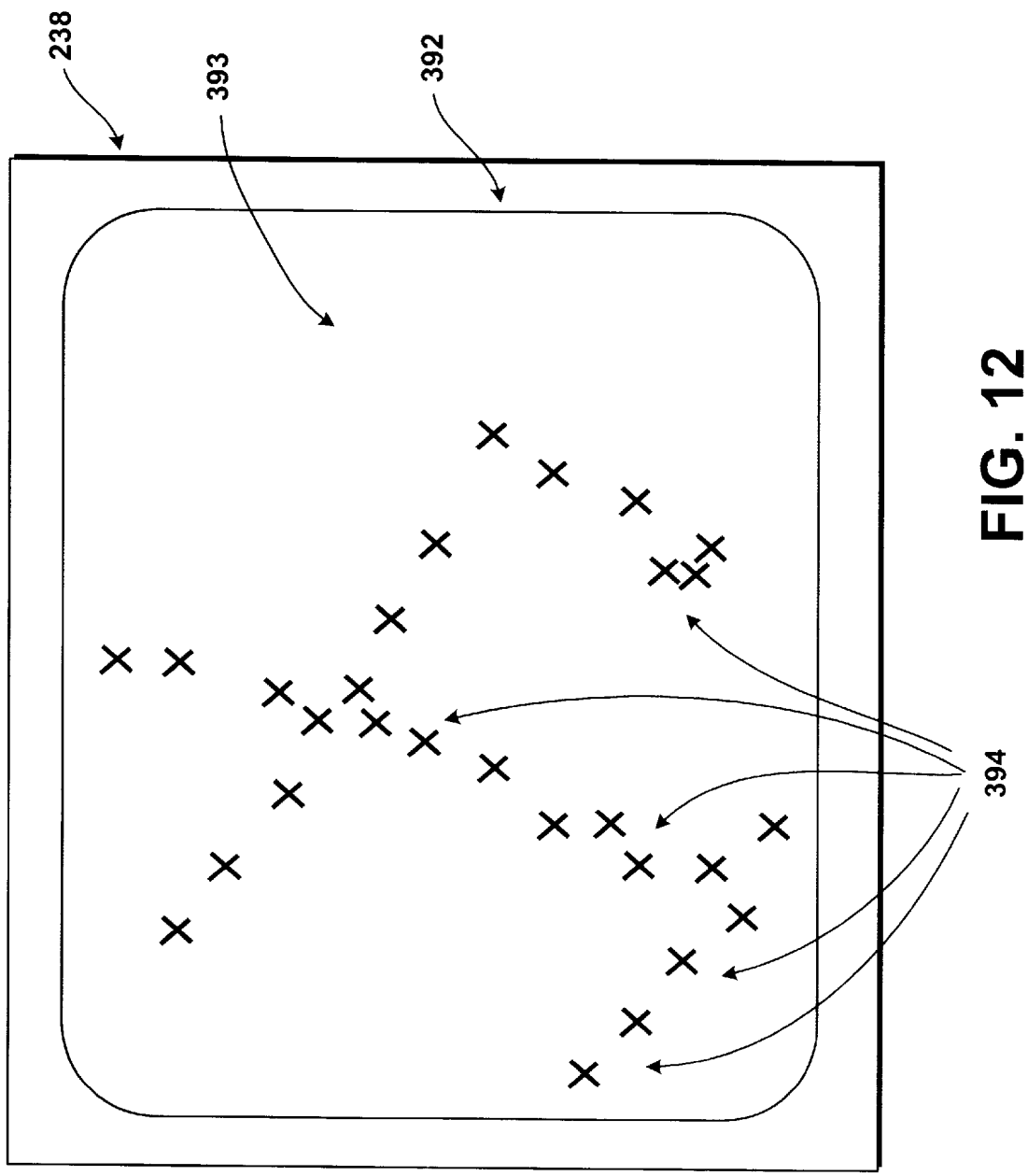
FIG. 12 is a visual display provided by the database updating program of FIG. 11 showing some of the data collected by the data collection system.

The database updating program 390 graphically depicts the data that had been collected in the field using the data collection system and allows the researcher to make changes or additions to the primary version of the geographic database while observing the graphical depiction of the collected data. FIG. 12 shows a display 392 on a computer screen. The database-updating program 390 (in FIG. 11) renders the display 392. The database-updating program 390 shows a scaled map 393 of a portion of the geographic assignment area. Overlaid on the display 392 are indications 394 of the positions at which the position determining system 230 determined the vehicle to be as it traveled along roads in the assignment area. These indications 394 are derived from the vehicle position data (i.e., "POS") in the file 314 (in FIG. 8). The indications 394 are rendered on the display 392 at relative locations corresponding to their geographic coordinates. As a result, the indications 394 form an outline of the roads upon which the vehicle traveled.

Figure 13:
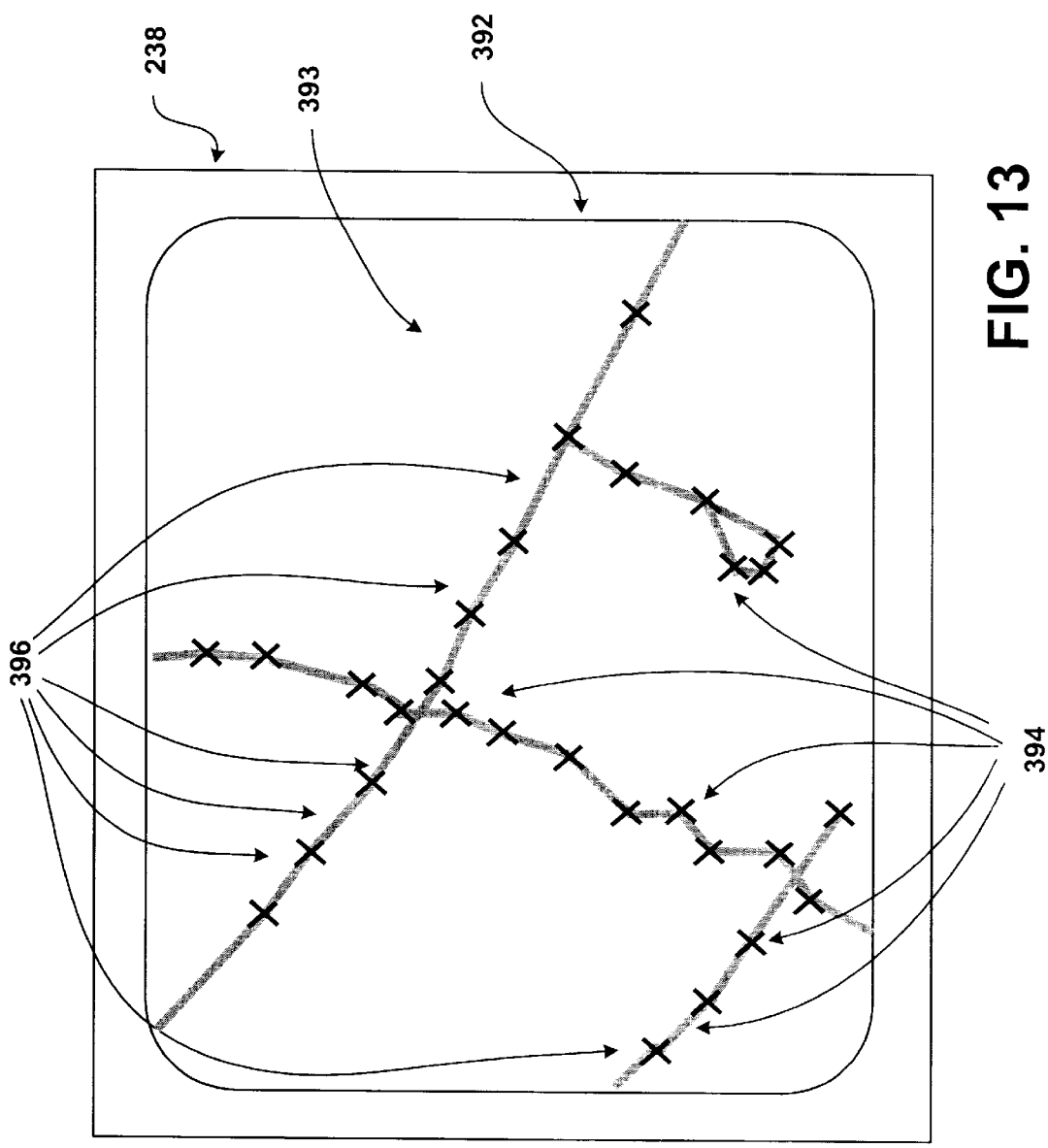
FIG. 13 shows another visual display provided by the database updating program of FIG. 11.

FIG. 13 shows another display 395 rendered by the database updating program 390. The display 395 shows the same portion of the assignment area shown on the display 392 of FIG. 12. FIG. 13 shows the same vehicle position indications 394 as shown in FIG. 12. Using the order in which the vehicle position data occurs in the file 314 as well as the heading data in the file 314, the vehicle position indications 394 have been connected by lines 396. The resulting connected lines 396 generally outline the roads upon which the vehicle traveled.

Figure 14:
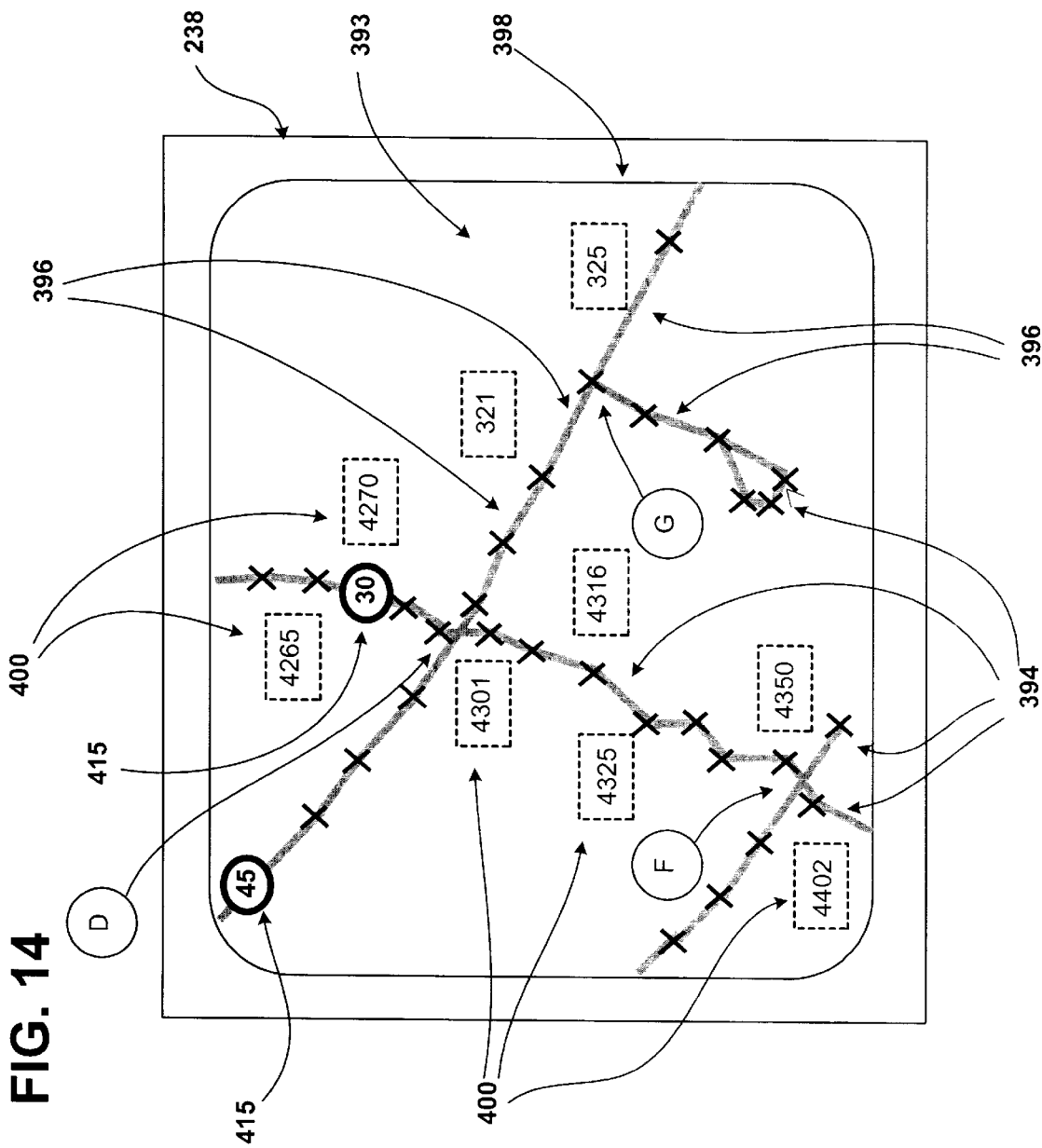
FIG. 14 is a visual display provided by the database updating program of FIG. 11 showing some of the address data collected by the data collection system.

FIG. 14 shows a display 398 rendered by the database-updating program 390 of FIG. 11. The display 398 in FIG. 14 shows the same portion of the assignment area shown on the display 392 of FIG. 13. FIG. 14 also shows the same vehicle position indications 394 as shown in FIG. 13. In addition, FIG. 14 shows text boxes 400. Each text box 400 includes one of the address text strings (i.e., "ADDRESS TEXT") that had been saved in the file 344 (in FIG. 8). Each text box 400 is rendered on the display 398 at the relative location corresponding to the geographic coordinates of the pseudo position associated with the address text. As a result, the text boxes 400 are relatively positioned with respect to the corresponding actual positions of the buildings observed by the researcher.

Note that one of the text boxes 400 includes an address text string "4301" that is underlined. These text boxes with underlining correspond to pseudo positions to which a corner indication (i.e., "CORNER") was associated in the file 344.

Figure 15:
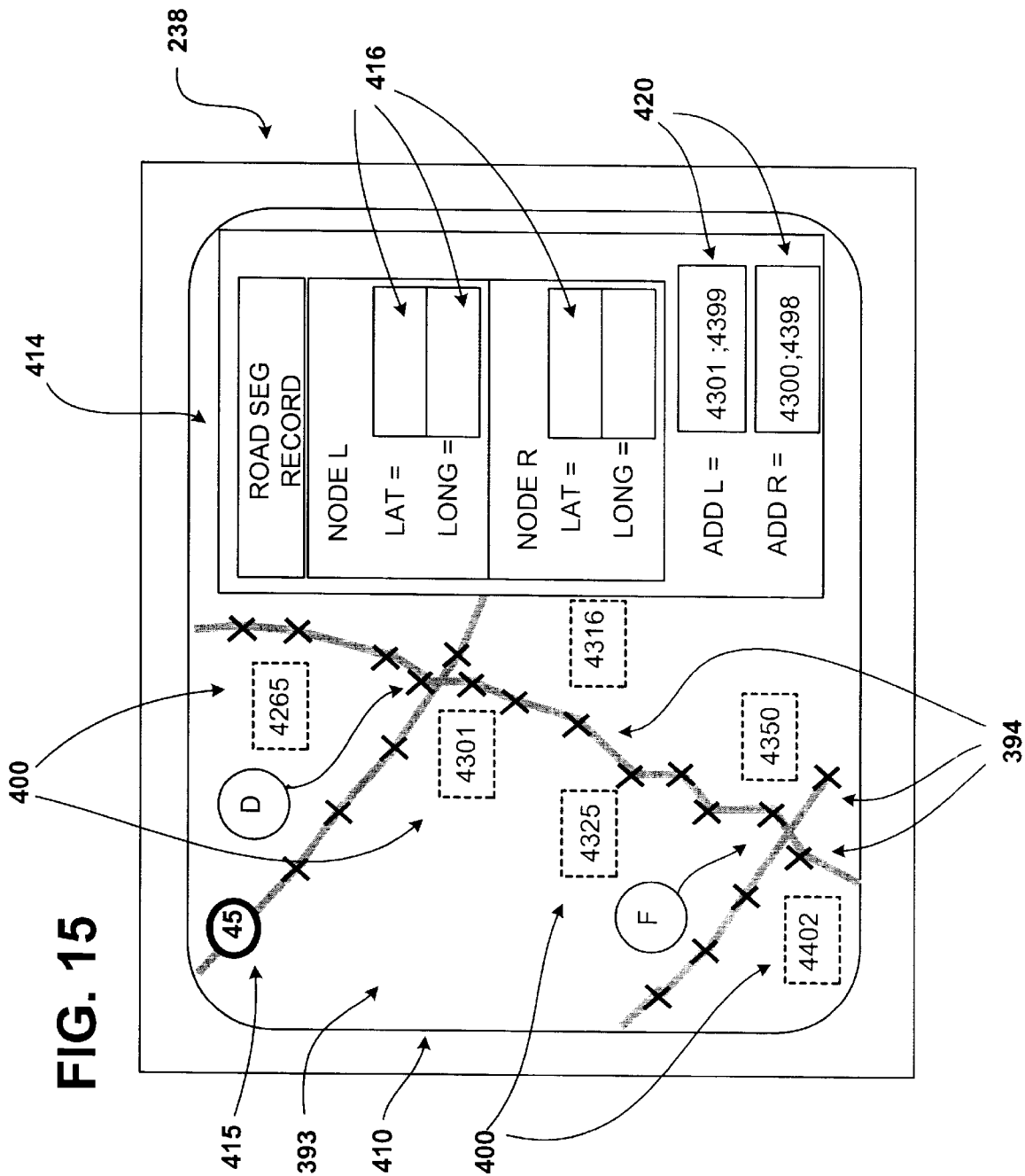
FIG. 15 shows the visual display of FIG. 14 with a data entry window overlaid on the map to allow a researcher to add data to the geographic database.
Figure 16:
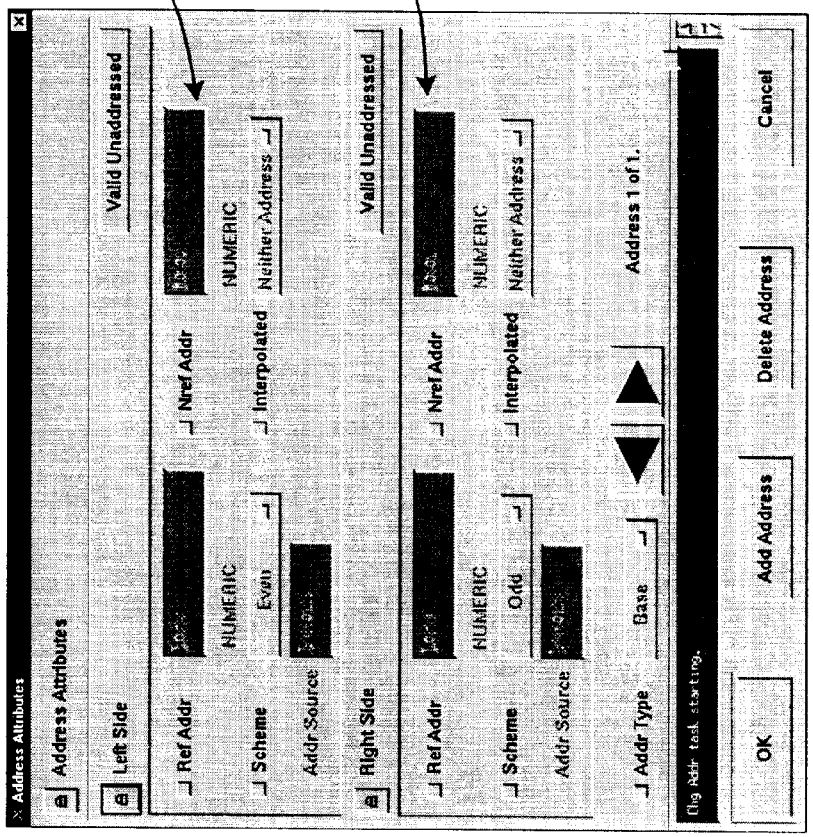
FIG. 16 shows an actual data entry window similar to the window in FIG. 15 used for entering address data to the geographic database.

FIG. 15 shows a display 410 of the same portion of the assignment area shown on the display 398 in FIG. 14. The display 410 in FIG. 15 shows an example of a data entry window 414 overlaid on the map 393. The database-updating program 390 (in FIG. 11) renders the display 410 and the data entry window 414. Using the information presented on the display 410 in FIG. 15 and the input device(s) of the computer upon which the database updating program 390 is installed (such as the portable computer 238), the researcher can add data to or modify data in the primary version of the geographic database 100. The data entry window 414 in FIG. 15 includes input fields 416. The input fields 416 can be used to enter data for adding a data record to the primary version of the geographic database 100 (in FIG. 1) or modifying an existing data record in the geographic database 100. (An actual data entry window with input fields is shown in FIG. 16. However, for the sake of clarity, reference will be made to the example shown in FIG. 15.)

For example, using the input device(s) of the computer upon which the database-updating program 390 is installed, the researcher can identify road segments, intersections, curves in the roads, as well as other information from the display 410. For instance, using the display 410, the researcher can identify intersections at the positions labeled "D" and "F." Using a routine in the database-updating program 390, the geographic coordinates of the positions of the intersections can be determined. For example, the researcher can move a pointing device (such as a glove, mouse or digitizing tablet) to identify the positions of the intersections on the display 410. A routine in the database-updating program 390 then translates the positions of the pointing device to geographic coordinates. The geographic coordinates of the intersections at the end points of the road segment (i.e., the nodes) are added to the appropriate fields 416. The coordinates of the nodes may be added automatically from the position of the pointing device.

The researcher can identify road segments that connect each pair of intersections. In some geographic databases, each road segment is represented by a separate data record or entity. Characteristics of each road segment are associated with the road segment data entity as attributes.

With respect to each road segment along which is located at least one building with an address, address range attributes are determined and associated with the road segment data entity. Identifying address ranges instead of actual addresses can be more reliable for route calculation and guidance. For example, a person using a navigation system to calculate a route to an address may not know the exact address or may have the address number incorrect by only a few digits. Thus, it is preferable to determine an address range for each road segment so that any address number sought by a person can be identified with a road segment even if the actual address number is not physically present on the actual road segment.

Using the display 410 in FIG. 15, the researcher can determine a range of addresses for the road segment between the intersections labeled "D" and "F." The addresses data from file 344 that had been obtained while traveling in the assignment area using the data collection system 225 are shown in the text boxes 400 on the display 410. From the displayed information, the researcher can observe the addresses "4301", 4316", "4325", and 4350." Also, the researcher can observe the address "4402" on the adjacent road segment across the intersection labeled "F." From this displayed information, the researcher can determine the address range data to associate with the data record that represents the road segment between the intersections labeled "D" and "F."

In some databases, a data entity that represents a road segment can include address range data for each side of the road segment. If the geographic database being updated with the database updating program 390 includes address range information for each side of the represented road segment, the data record formed to represent the road segment between the intersections labeled "D" and "F" would have odd numbers between "4301–4399" on the left side of the road segment and even numbers between 4300–4398 on the right side of the road segment. (The "left" and "right" sides of a road segment are relative based upon any arbitrary convention applied to the database. For example, "west" and "north" sides of roads may be considered "left" sides and "east" and "south" sides of roads may be considered "right" sides.)

Included among the input fields 416 are fields 420 for inputting left and right address ranges. Using these fields 420 and the information displayed in the text boxes 400 on the map 393 of the portion of the geographic area in which the data collection system was operated, the researcher can add address range data to a data record that represents a road segment.

If the geographic database being updated with the updating program 390 does not include separate address ranges for each side of a road segment, or if the actual addresses along the road segment are not separated by odd and even numbers, only a single range may be determined for the data record that represents the road segment. Under these circumstances, the researcher can determine a single address range "4300–4399" for the data record that represents the road segment between "D" and "F." This data can be added to one of the fields 420 of the data entry window 414.

After the researcher adds the address range data to the appropriate fields 420 of the data record, other data attributes relating to the represented road segment can be added. Such other attributes may include the street name, shape points (i.e., coordinates along the road segment at which the road curves), and other information.

After all the data for the data record that represents the road segment between the intersections labeled "D" and "F" has been entered into the appropriate fields, the researcher can use the database updating program to add information about other road segments or other geographic features. When the researcher is finished adding and/or modifying data using the database updating program 390, all the additions and modifications (424 in FIG. 11) are applied to the primary copy of the geographic database 100. These additions and modifications 424 may be sent from the portable computer 238 located at one of the field offices to the main computer 116 over the data network 240.

The researcher can then use the data collection system 225 in the same or another assignment area to collect more data for updating the geographic database.

VII. Additional Embodiments and Alternatives

In the above embodiment, the data collection system was described as providing for collection of address data, speed limit data, unpaved road data and lane divider data. The data collection system can be used to collect additional types of data. For example, the data collection system can be used to collect names of streets, names of points of interest, such as shops, traffic sign data, traffic light data, data indicating the number of lanes, parking restriction data, time of day traffic restrictions, school crossings, parking data, and so on.

In the above described embodiments, certain words, such as "LEFT", "RIGHT", "COMMIT", and so on, are used as gestured commands. In alternative embodiments, different words may be used to express the same or similar commands. For example, the word "STORE" may be used instead of the word "COMMIT."

In connection with some of the embodiments described above, a pseudo position was based on the most recent position data calculated by the position determining system. In alternative embodiments, the pseudo position may be based upon a position other than the most recent position determined by the position determining system. For example, the pseudo position may be extrapolated between the last position determined by the position determining system and the next position determined by the position determining system. In another alternative, the pseudo position may be offset by a fixed or calculated amount to take into account vehicle speed, direction, etc.

In the embodiments described above, the map of the geographic area with the address data, speed limit data, etc., was displayed on the personal computer by the database updating program while updating the primary version of the geographic database. In an alternative embodiment, the map of the geographic area with the address data, speed limit data, etc., can also be displayed on the personal computer by the data collection program 236 while the data is being collected. This may assist the researcher in confirming that data is being properly collected.

VIII. Advantages

The present system and method provide for collecting data for a geographic data efficiently and quickly. The data collection system includes the ability to recognize hand and/or finger gestures that represent commands to facilitate data collection while traveling through a geographic data area.

It is intended that the foregoing detailed description be regarded as illustrative rather than limiting and that it is understood that the following claims including all equivalents are intended to define the scope of the invention.

I claim:

1. A data collection system to collect data for a geographic database comprising:
    a device for inputting hand gestures relating to an observing of a geographic feature;
    a first component that interprets the hand gestures into computer recognizable commands regarding the observed geographic feature;
    a second component that receives data indicative of positions while traveling along roads in a geographic area; and
    a third component that associates one of the positions with the observed geographic feature and stores data indicative thereof.

2. The system of claim 1 wherein the device for inputting hand gestures is a glove electronically connected to the first component.

3. The system of claim 1 wherein the hand gestures comprise hand and finger movements.

4. The system of claim 1 wherein the hand gestures represent a lateral direction, address, place, speed, divider, unpaved, special advisory sign, stop sign, restricted access, bridge, or tunnel.

5. The system of claim 1 wherein data indicative of positions while traveling correspond to positions of a vehicle.

6. The method of claim 1 wherein the data is stored in a computer-readable data file.

7. The system of claim 1 further comprising:
   a fourth component for converting the computer recognizable commands into audible speech.

8. The system of claim 1 further comprising:
   a map on a computer display screen, wherein the map shows a portion of the geographic region and data indicative of the observed geographic feature at a location corresponding to the position.

9. A method of collecting data for a geographic database comprising the steps of:
   travelling through a geographic region;
   determining positions while traveling;
   observing a geographic feature;
   making a hand gesture related to the observing of the geographic feature;
   determining a pseudo position based upon one of the positions determined while traveling; and
   storing data indicative of the pseudo position and the observed geographic feature in a computer-readable data file.

10. The method of claim 9 further comprising the step of:
    determining a vehicle heading while traveling.

11. The method of claim 9 further comprising:
    matching the gesture with stored gestures that correspond to commands in a table.

12. The method of claim 11 further comprising:
    converting the command into audible speech.

13. The method of claim 9 wherein the pseudo position is the one of the positions determined most recently.

14. The method of claim 9 wherein the step of determining positions is performed with a GPS receiver.

15. The method of claim 9 further comprising:
    before the step of storing data in the computer-readable data file, making a gesture to store the data.

16. The method of claim 9 wherein the step of storing further comprises storing data indicative of the positions determined while traveling.

17. A method of using a data collection system to collect data for a geographic database comprising the steps of:
    travelling in a vehicle along roads in a geographic region;
    transporting the data collection system in the vehicle while traveling along the roads;
    continuously determining instantaneous geographic coordinates of positions of the vehicle while traveling along the roads;
    making a simple hand gesture commanding the data collection system to store data about a geographic feature;
    associating data about the geographic feature with recently determined geographic coordinates of the vehicle; and
    storing the associating data about the geographic feature with the recently determined geographic coordinates of the vehicle in a computer-readable data file.

* * * * *